United States Patent
Eckardt

[19]

[11] Patent Number: 5,872,825
[45] Date of Patent: Feb. 16, 1999

[54] APPARATUS AND METHOD FOR INERTING AND VENTING THE CONTAINMENT ATMOSPHERE IN A NUCLEAR POWER STATION

[75] Inventor: Bernd Eckardt, Bruchköbel, Germany

[73] Assignee: Siemens Aktiengesellschaft, Munich, Germany

[21] Appl. No.: 33,122

[22] Filed: Mar. 2, 1998

Related U.S. Application Data

[63] Continuation of PCT/EP96/03844 Aug. 2, 1996.

[30] Foreign Application Priority Data

Sep. 1, 1995 [DE] Germany ............... 195 32 366.1

[51] Int. Cl.[6] .................................................. G21C 9/004
[52] U.S. Cl. ..................... 376/314; 376/313; 376/309; 376/283
[58] Field of Search .................. 376/283, 308, 376/309, 310, 313, 314

[56] References Cited

U.S. PATENT DOCUMENTS

| | | | |
|---|---|---|---|
| 3,910,817 | 10/1975 | Frumerman et al. | 376/300 |
| 3,999,968 | 12/1976 | Brokkman | 55/284 |
| 5,017,331 | 5/1991 | Eckardt | 376/313 |
| 5,227,127 | 7/1993 | Sato | 376/313 |
| 5,487,783 | 1/1996 | Agnello et al. | 118/715 |

FOREIGN PATENT DOCUMENTS

| | | |
|---|---|---|
| 0285845A1 | 10/1988 | European Pat. Off. . |
| 0466052A1 | 1/1992 | European Pat. Off. . |
| 2922717C2 | 1/1983 | Germany . |
| 3637795A1 | 5/1988 | Germany . |
| 3715467A1 | 11/1988 | Germany . |
| 3806872A1 | 9/1989 | Germany . |
| 4141496A1 | 7/1992 | Germany . |
| 4421601C1 | 8/1995 | Germany . |
| 2260917 | 5/1993 | United Kingdom . |

OTHER PUBLICATIONS

Japanese Patent Abstract No. 5172980 (Makoto), dated Jul. 13, 1993.
Japanese Patent Abstract No. 4286994 (Hiroaki), dated Mar. 15, 1991.
Japanese Patent Abstract No. 61086680 (Hitachi), dated May 2, 1986.
Japanese Patent Abstract No. 7104087 (Hiroshi et al.), dated Apr. 21, 1995.

*Primary Examiner*—Charles T. Jordan
*Assistant Examiner*—Matthew J. Lattig
*Attorney, Agent, or Firm*—Herbert L. Lerner; Laurence A. Greenberg

[57] ABSTRACT

When hydrogen is generated within the containment of a nuclear power station, its containment atmosphere must be inerted. An undesired pressure buildup within the containment is prevented during such inerting with the apparatus and the method. It is possible to vent and inert the containment atmosphere simultaneously. A reversible activity holdup device is provided, which makes it possible to vent the containment atmosphere, without radioactive material being released into the surroundings. It is thereby also possible for the containment of a nuclear power station to be inerted even as a preventive measure, so that the safety of the nuclear power station plant is markedly increased.

22 Claims, 2 Drawing Sheets

APPARATUS AND METHOD FOR INERTING AND VENTING THE CONTAINMENT ATMOSPHERE IN A NUCLEAR POWER STATION

CROSS-REFERENCE TO RELATED APPLICATION

This application is a continuation of copending international application PCT/EP96/03844, filed Sep. 2, 1996, which designated the United States.

BACKGROUND OF THE INVENTION

FIELD OF THE INVENTION

The invention relates to nuclear power generation, and more specifically it pertains to an apparatus for inerting and venting the atmosphere of a containment vessel in a nuclear power station, and to a method for operating an apparatus of this type.

In the event of an emergency or an accident in a nuclear power station, where, for example upon the oxidation of zirconium when the core is heated, the formation and release of hydrogen gas within the safety vessel or containment surrounding the reactor core must be expected. Explosive gas mixtures may form as a result within the containment.

In order to prevent explosive gas mixtures of this type from being formed in the containment of a nuclear power station, various devices or methods are envisioned. These include, for example, devices, such as catalytic recombinators, catalytically and electrically operated ignition devices, or the combination of the two systems, as well as methods for permanent or subsequent inerting of the containment.

In order to inert the containment of a nuclear power station, a nonreactive gas, such as, for example, nitrogen ($N_2$) or carbon dioxide ($CO_2$), may be supplied as an inerting agent into the containment. In an alternative process, liquid gas may be fed in for inerting via branched nozzle systems or conventional gas feed systems with an integrated oil burner or gas burner evaporator plant. Other variants are based on a feed of liquid gas, a feed into a water sump within the containment also being provided on account of the absence of evaporation energy in the atmosphere of the latter. An apparatus for inerting the atmosphere in the containment of a nuclear power station is known, for example, from German patent specification DE 44 21 601 C1.

Feeding an inerting agent into the containment may result in a pressure rise within the containment. Such a pressure rise may also occur in an already preinertized containment, in particular one with a high specific Zr mass and small containment volume. This in turn makes it necessary to relieve the containment pressure by venting the containment atmosphere. However, the containment atmosphere usually contains radioactive material, such as, for example, inert gases, iodine or aerosol, which could escape into the surroundings of the nuclear power station during venting. Accordingly, because of the radioactive material in the containment atmosphere, venting of the containment atmosphere in the event of an accident or fault does not come under consideration.

SUMMARY OF THE INVENTION

It is accordingly an object of the invention to provide a device and method for inerting and venting the containment atmosphere in a nuclear power station, which overcomes the above-mentioned disadvantages of the heretofore-known devices and methods of this general type and which allows safe inerting and venting of the containment atmosphere of a nuclear power station and without harming the surroundings of the nuclear power station.

With the foregoing and other objects in view there is provided, in accordance with the invention, an apparatus for inerting and venting the containment atmosphere in a nuclear power station, comprising:

a supply line for an inerting agent communicating with a containment vessel of a nuclear power station;

a vent line for containment atmosphere communicating with the containment; and a joint reversible activity holdup device communicating with the vent line and with the supply line.

In other words, the objects of the invention are satisfied by the reversible activity holdup device, through which a supply line for an inerting agent and a vent line for containment atmosphere are led jointly. Alternatively, the reversible activity holdup device is inserted into a line for supplying an inerting agent and for venting containment atmosphere, the line being connected to the containment.

The use of an activity holdup in a nuclear power station is known, for example, from German published, non-prosecuted patent application DE 36 37 795 A1. However, there it is provided solely for relieving the pressure of the containment shell of the nuclear power station. In both alternatives, containment atmosphere vented from the containment flows through the activity holdup device. In this case, radioactive material, such as, for example, inert gases, iodine or aerosol, contained in the containment atmosphere is held up on adsorption material provided within the activity holdup device and is briefly stored. After the adsorption material has been charged in this way and before the radioactive material has broken through, that is to say before the material is released to the ambient air, the operating mode of the activity holdup device is changed in such a way that inerting agent now flows through the latter in the opposite direction. In this case, the held-up radioactive material is released from the adsorption material and is flushed back into the containment together with the inerting agent. It thus becomes possible to inert the containment atmosphere or maintain the inerting, while pressure relief is ensured for the containment at the same time. In this case, a release of radioactive material to the surroundings is reliably avoided at all times. Moreover, additional waste, for example in the form of clogged filter elements, is avoided due to the use of the reversible activity holdup device. In this case, the inerting agent may be, for example, nitrogen ($N_2$), $CO_2$, steam or else another gas having a nonoxidizing effect.

In accordance with an added feature of the invention, the activity holdup device includes a filter element mounted rotatably about an axis. Such an activity holdup device, similar to a regenerating wheel, may be operated in continuous regeneration. In this case, the vent line and the supply line are led via spatially different regions of the activity holdup device, activity-resistant and noncombustible sealing materials expediently being selected for sealing off, relative to one another, the gas streams which are carried in the vent line and the supply line. Rotating the activity holdup device thus ensures that each part region of the activity holdup device is alternately laden with radioactive material by the vented containment atmosphere and is regenerated by inerting agent flowing through the part region in the opposite direction.

In accordance with another feature of the invention, there is provided an apparatus for inerting and venting a containment atmosphere in a nuclear power station which comprising: a line for supplying an inerting agent to and for venting containment atmosphere from a containment of a nuclear power station, the line communicating with the containment; and a reversible activity holdup device inserted in the line.

In accordance with an additional feature of the invention, the activity holdup device includes adsorption material which is activated charcoal, a molecular sieve, and/or zeolite. In accordance with a further feature of the invention, the adsorption material has an inner exchange surface of at least 1000 $m^2/m^3$.

In accordance with again an added feature of the invention, there is provided an aerosol separating device communicating with the activity holdup device for separating aerosols from the containment atmosphere. The activity holdup device is either preceded or followed by the separating device for aerosols and/or iodine sorbents in the direction of flow of the containment atmosphere.

In accordance with again an additional feature of the invention, there is provided a superheater connected upstream from the activity holdup device in a flow of the inerting agent. Superheating the inerting agent assists particularly the regeneration of the adsorption material and thereby achieve a particularly long life for the activity holdup device. The superheater may, for example, be a water energy accumulator or else a high temperature dry accumulator. However, other heating devices or evacuating devices are also conceivable. Moreover, superheating of the inerting material which can be achieved in this way can ensure that only dry inerting agent flows through the activity holdup device. Dry inerting agent of this type has a particularly beneficial effect on regeneration of the activity holdup device. Advantageously furthermore, a control device is provided for setting the temperature of the inerting agent before the latter enters the activity holdup device.

In order to avoid an excessive rise in pressure in the containment particularly effectively, the inerting agent expediently contains steam. Superheated steam supplied to the containment condenses within the latter. This condensation leads to a pressure reduction within the containment. Thus, particularly in conjunction with a suction extraction device advantageously provided in addition and connected to the vent line, it is possible to ensure that a vacuum is permanently maintained in the containment. This avoids a release of radioactive material into the surroundings in a particularly reliable way. A suction extraction device of this type can thus be used particularly effectively in the case of a nontight containment with leakage. In this case, the inerting agent may consist solely of steam or else contain other material, for example nitrogen ($N_2$) or carbon dioxide ($CO_2$) in addition to steam.

It is possible with the invention to provide a stack which communicates with the vent line.

In accordance with a concomitant feature of the invention, a selfclosing shutoff fitting is connected in the supply line. The self-closing fitting ensures that the containment is closed off relative to the environment and a release of radioactive material into the environment is thus reliably avoided. A selfclosing shutoff fitting of this type may be closed, for example, by spring force or by weight. When the inerting agent is being supplied, the fitting is opened by the pressure of the inerting agent, the pressure acting counter to the spring force or weight, so that it becomes possible for the inerting agent to flow into the containment.

With the above and other objects in view there is also provided, in accordance with the invention, a method of inerting and venting a containment atmosphere in a containment of a nuclear power station. The method comprises at least the following steps: feeding inerting agent into a containment in a feed flow, venting a containment atmosphere from the containment in a vent flow, and alternatingly conducting the feed flow and the vent flow through a reversible activity holdup device.

In accordance with again another mode of the invention, the method further comprises, in the activity holdup device, separating radioactive material out of the vent flow of the vented containment atmosphere and conveying the radioactive material back into the containment with the feed flow of the inerting agent through the activity holdup device.

In an advantageous development, radioactive material contained in the vented containment atmosphere is separated in the activity holdup device and, when the inerting agent subsequently flows through the activity holdup device, is conveyed back into the containment. In this case, the activity holdup device may operate continuously, for example on the regenerating wheel principle, or else discontinuously, for example by changeover and countercurrent regeneration.

In accordance with a concomitant feature of the invention, the temperature of the inerting agent is regulated before it enters the activity holdup device. Finally, the inerting agent may be superheated in order to be dried.

The advantages achieved by means of the invention are, in particular, that, by virtue of the reversible activity holdup device, it is possible for the inerting agent to be supplied into the containment of a nuclear power station at any time, without an inadmissible pressure buildup taking place in the containment. Consequently, inerting the containment in this way does not entail the disadvantages normally associated with a pressure rise in the containment. Inerting of this kind may be used in a particularly flexible way and may also take place in a preemptive mode. The safety of the plant as a whole is therefore markedly increased not only in the event of emergency or accident situations, but also in the case of slight deviations of the state of the nuclear power station from a normal state.

Other features which are considered as characteristic for the invention are set forth in the appended claims.

Although the invention is illustrated and described herein as embodied in an apparatus and method for inerting and venting the containment atmosphere in a nuclear power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
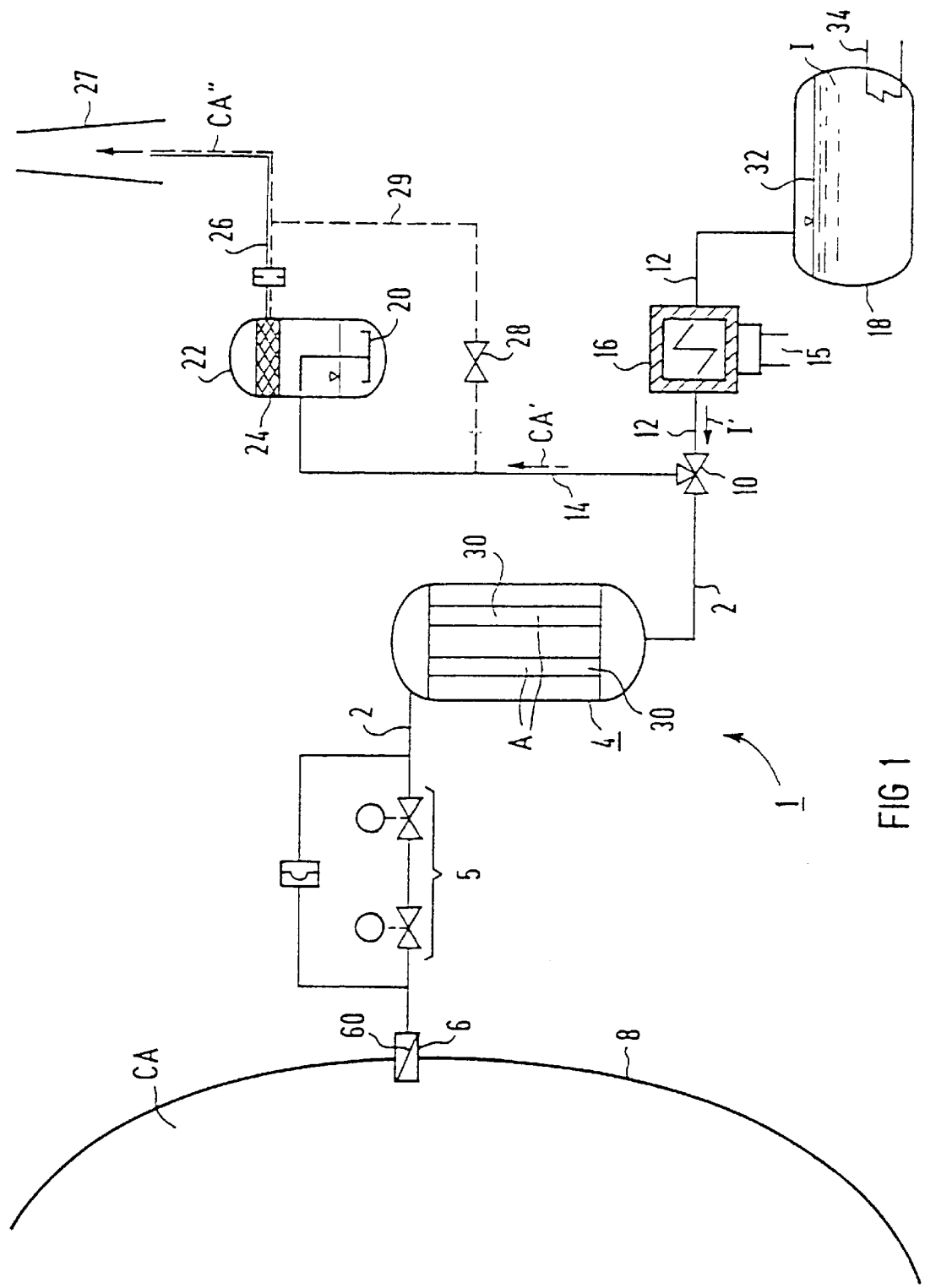
FIG. 1 is a schematic view of an apparatus for inerting and venting the containment atmosphere in a nuclear power station with an activity holdup device.

Referring now to the figures of the drawing in detail, wherein like parts bear the same reference symbols in both figures, and first, particularly, to FIG. 1 thereof, there is seen an apparatus 1 for inerting and venting a containment atmosphere CA in a nuclear power station. The latter is not illustrated or described in more detail for purposes of brevity of this specification. The apparatus 1 comprises a line 2, into which an activity holdup device 4 is inserted. The line 2, capable of being shut off by means of a valve configuration 5, communicates, on the one hand, via a leadthrough 6 with the interior of a reactor safety vessel or containment 8 of the nuclear power station and, on the other hand, with a distributor 10 in the form of a threeway valve. In the distributor 10, the line 2 branches into a supply line 12 for an inerting agent I and into a vent line 14 for containment atmosphere CA.

The supply line 12 has a heat exchanger 16 (superheater) provided with a control device 15 for temperature regulation inserted. The supply line 12 is connected to a storage tank 18 for the inerting agent I. The vent line 14 opens at its end 20, designed as a Venturi scrubber, into a tank 22 which is an iodine and/or aerosol separating device and which has a filter element 24 in its upper region. An exhaust-gas line 26 is connected to the tank 22 on the outlet side via the filter element 24. The exhaust-gas line 26 opens into a stack 27, advantageously via a non-illustrated gas suction extraction device. Moreover, the vent line 14 is shunted in parallel with the tank 22 to the exhaust-gas line 26 via a bypass line 29. The bypass line 29 can be shut off with a valve 28.

The activity holdup device 4 has a number of filter inserts 30, two of which are shown in FIG. 1. In this case, each filter insert 30 has adsorption material A on its surface.

When it becomes necessary to inert the containment atmosphere CA, first the inerting agent I, which is present in liquid form in the storage tank 18 up to a level 32, is partially evaporated by means of a heating device 34. In this case, the inerting agent I may, for example, be nitrogen ($N_2$), carbon dioxide ($CO_2$), water or a mixture of these. The evaporated inerting agent I flows to the distributor 10 via the supply line 12 and also passes through the heat exchanger 16. The inerting agent I is superheated in the heat exchanger 16. The heat exchanger 16 may be an actively heated heating element or else a permanently heated heat energy reservoir (high temperature dry accumulator).

To supply inerting agent I' superheated in this way into the interior of the containment 8, the passage of the supply line 12 to the line 2 is opened via the distributor 10, so that the superheated inerting agent I' is supplied to the activity holdup device 4 via the line 2. In the activity holdup device 4, the superheated inerting agent I' flows through the filter inserts 30 and then passes via the line 2 and the leadthrough 6 into the interior of the containment 8, where it contributes to inerting the containment atmosphere CA.

After a quantity of superheated inerting agent I'—so much as to require a pressure reduction —has been supplied to the interior of the containment 8, the connection between the supply line 12 and the line 2 is closed and the connection between the vent line 14 and the line 2 is opened via the distributor 10. With the distributor 10 in this position, it becomes possible to vent the containment atmosphere CA, i.e., to bleed the containment atmosphere CA. In this case, containment atmosphere CA vented from the containment 8 flows through the activity holdup device 4 and its filter inserts 30. Radioactive material, such as, for example, inert gases, contained in the containment atmosphere CA is held up by adsorption on the filter inserts 30. Then, as indicated by the arrow, the filtered containment atmosphere CA' flows to the iodine and aerosol separator tank 22. Due to the interaction of the end 20 of the line 14 and the filter element 24, wherein the end is designed as a Venturi washer, iodine and/or aerosols are removed from the containment atmosphere CA'. The containment atmosphere CA", which has thus been further cleaned, is then released into the surroundings via the stack 27.

After the pressure in the interior of the containment 8 has thus been sufficiently equalized, additional inerting agent I is supplied to the containment once again in a further step. For this purpose, the distributor 10 closes the connection of the line 2 to the vent line 14 and simultaneously opens the connection of the line 2 to the supply line 12. Superheated inerting agent I' thus flows once again into the interior of the containment 8 and, in this case, once more passes the activity holdup device 4 and its filter inserts 30. When the inerting agent I' flows through the filter inserts 30, it releases the radioactive material absorbed on these and conveys it back into the interior of the containment 8.

Operating the apparatus 1 alternatingly and therefore discontinuously in this way reliably avoids the release of radioactive material even when the containment 8 is being vented.

Figure 2:
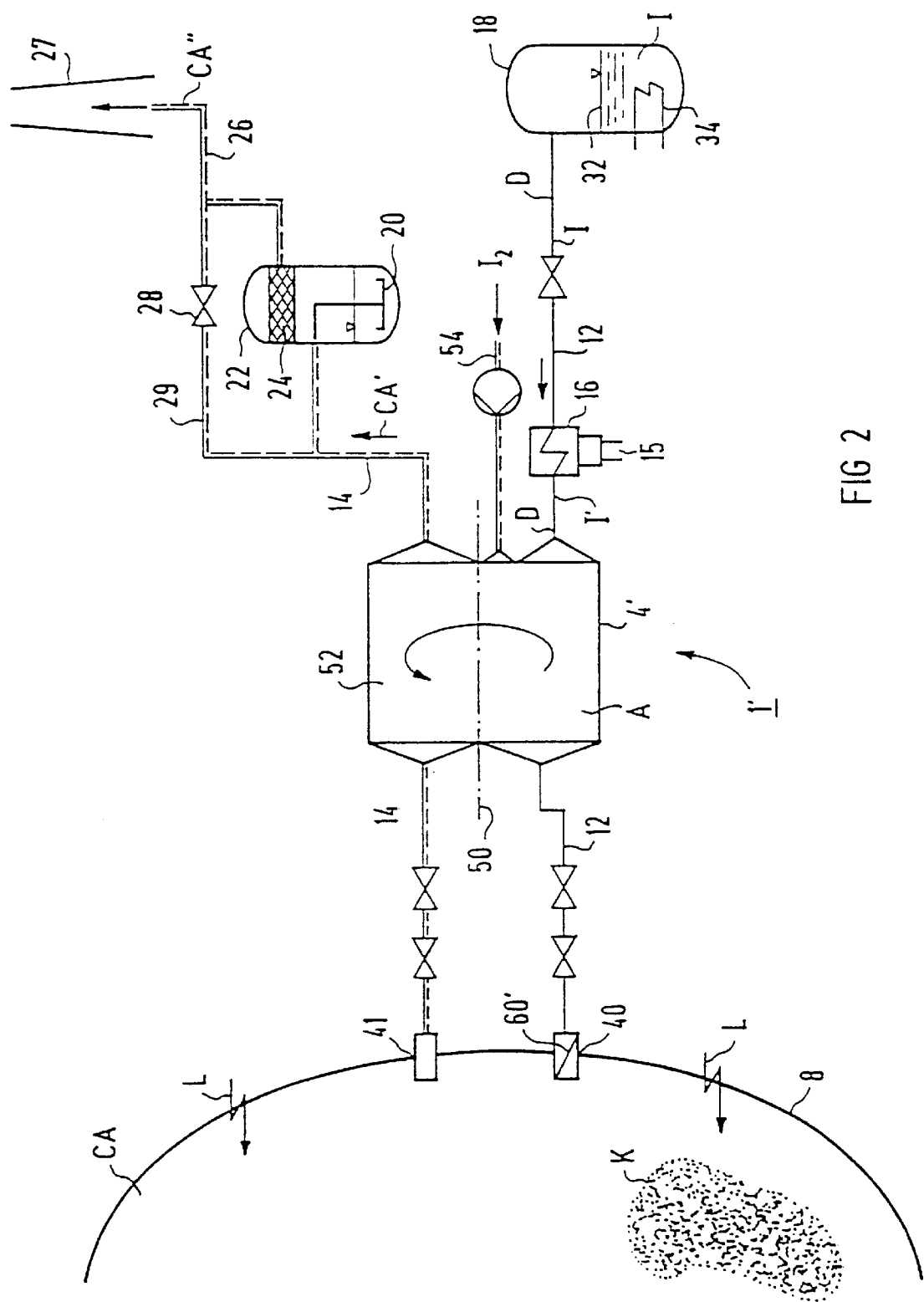
FIG. 2 is a similar view of an alternative apparatus for inerting and venting the containment atmosphere in a nuclear power station, with a rotatable activity holdup device.

Referring now to FIG. 2, in the alternative apparatus 1' for inerting and venting the containment atmosphere CA, the supply line 12 for the inerting agent I and the vent line 14 for containment atmosphere CA are connected to the interior of the containment 8 through the leadthroughs 40 and 41, respectively. In this embodiment too, the supply line 12, into which the superheater heat exchanger 16 is inserted, is connected to the storage tank 18 for the inerting agent I. The vent line 14 is connected to the stack 27 via the tank 22, which is an iodine and aerosol separating vessel.

In this exemplary embodiment, the supply line 12 and the vent line 14 are led via a joint reversible activity holdup device 4'. Here, the activity holdup device 4' is designed as a regenerating wheel. It comprises a filter element 52 which is mounted rotatably about an axis 50 and which also is provided with an adsorption agent A.

The activity holdup device 4' can be operated continuously. Containment atmosphere CA vented from the containment 8 flows through part of the filter element 52, the part being located in the region of the vent line 14. Only this part of the filter element 52 is laden with radioactive material contained in the containment atmosphere CA. Similarly to the exemplary embodiment according to FIG. 1, the filtered containment atmosphere CA' subsequently flows to the tank 22, which is an iodine and/or aerosol separating device.

Due to the rotation of the filter element 52 about the axis 50, that portion of the filter element 52 which is laden with radioactive material is removed from the region of the vent line 14 and is replaced by a portion of the filter element 52 which is not laden with radioactive material. Partial areas of the filter element 52 are sealed off relative to one another with activity-resistant and noncombustible sealing material.

Due to the rotation of the filter element 52 about the axis 50, that portion of the filter element 52 which is laden with radioactive material passes into the region of the supply line 12 for the inerting agent I. There, inerting agent I' (superheated in the heat exchanger 16 and to be supplied to the containment 8) flows through that filter portion which is laden with radioactive material. As a result, previously adsorbed radioactive material is released from the filter element 52 and flushed back into the containment 8. Each portion of the filter element 52 is thus continuously laden with radioactive material and subsequently regenerated. The operations of charging and regenerating the filter element 52 thus take place in parallel and simultaneously in the activity holdup device 4', so that the latter can be operated continuously. This rules out a buildup of excess pressure in the containment 8 at all times, so that inerting the containment 8 in this way is particularly flexible and may also take place as a preventive measure (prophylactic) at any time.

The inerting agent I provided in the exemplary embodiment according to FIG. 2 and stored in the storage tank 18 is water. This water I is evaporated completely or partially by means of the heating device 34. Steam D flowing to the activity holdup device 4' via the supply line 12 is superheated in the heat exchanger 16, so that particularly effective regeneration of that part of the filter element 52 through which the steam flows becomes possible. The steam D supplied condenses within the containment 8. This condensation, illustrated by the shading K, results in a pressure reduction or vacuum within the containment 8. It thereby becomes possible, particularly in combination with the stack 27, to maintain a vacuum permanently in the interior of the containment 8. By maintaining a vacuum of this kind, a discharge of radioactive material into the environment is reliably avoided, even in the case of a nontight containment 8 or in the event of leakage, since, as indicated by the arrows L in FIG. 2, leakages flow solely into the containment 8.

A further supply line 54 for supplying a further inerting agent $I_2$ may be connected to the activity holdup device 4' in parallel with the supply line 12. In this case, the inerting agent $I_2$ may be nitrogen ($N_2$) or carbon dioxide ($CO_2$). This arrangement of this type makes it possible to regenerate the filter element 52 by means of a mixture of steam D and inert gas $I_2$.

Each filter element 30, 52 of the activity holdup device 4 or 4' may advantageously have activated charcoal and/or a molecular sieve as adsorption material A. In this case, the finely distributed adsorption material has an inner exchange surface of at least 1000 $m^2/m^3$. For particularly effective regeneration of the filter elements 30 or 52, the temperature of the inerting agent I', $I_2$ supplied can be regulated. Temperature regulation of this type may be carried out, for example, by regulating the heat exchanger 16 by means of the control device 15 or else, in a way not illustrated in any more detail, by dividing the gas stream carried in the supply line 12 into part streams, only one of which is led via the heat exchanger 16 and is subsequently admixed again with the other part streams.

According to the exemplary embodiments shown in FIGS. 1 and 2, the activity holdup device 4, 4' is arranged outside the containment 8, but it may alternatively also be arranged within the containment 8.

In order to ensure that the containment 8 is closed off reliably and a discharge of radioactive material into the surroundings is thus safely avoided, the supply line 12, following the lead through 6 or 40 through the containment 8, is provided with a selfclosing shutoff fitting 60, 60'. This is opened, for example, by means of the feed pressure of the inerting agent I', $I_2$, said feed pressure acting counter to a spring force or weight. Thus, in the event of a failure or termination of the supply of inerting agent I', $I_2$, the containment 8 is closed off relative to the surroundings on a "failsafe" principle.

By means of an apparatus 1 or 1' of this type, it becomes possible at any time to inert the containment atmosphere CA and simultaneously vent the latter. Since an excess pressure buildup within the containment 8 is avoided, inerting in this way is possible at all times. Inerting may therefore take place after a "blowdown" or according to other criteria, such as, for example, "$H_2$ concentration too high", "core filling level too low", or else as a preventive measure, since under no circumstances is there any fear that radioactive material will be released into the environment. Moreover, it is possible for the containment atmosphere CA to be inerted for a short time and even in the event of a failure of important systems (station blackout).

I claim:

1. An apparatus for inerting and venting the containment atmosphere in a nuclear power station, comprising:

a supply line for an inerting agent communicating with a containment vessel of a nuclear power station;

a vent line for containment atmosphere communicating with the containment; and a joint reversible activity holdup device communicating with said vent line and with said supply line.

2. The apparatus according to claim 1, wherein said activity holdup device includes a filter element mounted rotatably about an axis.

3. The apparatus according to claim 1, wherein said activity holdup device includes adsorption material selected from the group consisting of activated charcoal and a molecular sieve.

4. The apparatus according to claim 1, wherein said activity holdup device includes adsorption material having an inner exchange surface of at least 1000 $m^2/m^3$.

5. The apparatus according to claim 1, which further comprises an aerosol separating device communicating with said activity holdup device for separating aerosols from the containment atmosphere.

6. The apparatus according to claim 1, which further comprises a superheater connected upstream from said activity holdup device in a flow of the inerting agent.

7. The apparatus according to claim 1, which further comprises a control device for setting a temperature of an inerting agent entering said activity holdup device.

8. The apparatus according to claim 1, wherein the inerting agent comprises water vapor.

9. The apparatus according to claim 1, which further comprises a stack communicating with said vent line.

10. The apparatus according to claim 1, which further comprises a selfclosing shutoff fitting connected in said supply line.

11. An apparatus for inerting and venting a containment atmosphere in a nuclear power station, comprising:

a line for supplying an inerting agent to and for venting containment atmosphere from a containment of a nuclear power station, said line communicating with the containment; and a reversible activity holdup device inserted in said line.

12. The apparatus according to claim 11, wherein said activity holdup device includes adsorption material selected from the group consisting of activated charcoal and a molecular sieve.

13. The apparatus according to claim 11, wherein said activity holdup device includes adsorption material having an inner exchange surface of at least 1000 $m^2/m^3$.

14. The apparatus according to claim 11, which further comprises an aerosol separating device communicating with said activity holdup device for separating aerosols from the containment atmosphere.

15. The apparatus according to claim 11, which further comprises a superheater connected upstream from said activity holdup device in a flow of the inerting agent.

16. The apparatus according to claim 11, which further comprises a control device for setting a temperature of an inerting agent entering said activity holdup device.

17. The apparatus according to claim 11, which further comprises a stack communicating with said vent line.

18. The apparatus according to claim 11, which further comprises a selfclosing shutoff fitting connected in said supply line.

19. A method of inerting and venting a containment atmosphere in a containment of a nuclear power station, which comprises: feeding inerting agent into a containment in a feed flow, venting a containment atmosphere from the containment in a vent flow, and alternatingly conducting the feed flow and the vent flow through a reversible activity holdup device.

20. The method according to claim 19, which comprises, in the activity holdup device, separating radioactive material out of the vent flow of the vented containment atmosphere and conveying the radioactive material back into the containment with the feed flow of the inerting agent through the activity holdup device.

21. The method according to claim 19, which further comprises regulating a temperature of the inerting agent.

22. The method according to claim 19, which further comprises superheating the inerting agent.

* * * * *

UNITED STATES PATENT AND TRADEMARK OFFICE
CERTIFICATE OF CORRECTION

PATENT NO. : 5,872,825
DATED : February 16, 1999
INVENTOR(S) : Bernd Eckardt

Page 1 of 1

It is certified that error appears in the above-identified patent and that said Letters Patent is hereby corrected as shown below:

Title page,
Item [63], should read as follows: Continuation of PCT/EP96/03844, September 2, 1996.

Signed and Sealed this

Thirtieth Day of April, 2002

Attest:

JAMES E. ROGAN
*Attesting Officer*     *Director of the United States Patent and Trademark Office*